US012693242B2

(12) United States Patent (10) Patent No.: US 12,693,242 B2

Tsukahara (45) Date of Patent: Jul. 28, 2026

(54) STATE DETECTION DEVICE, STATE DETECTION METHOD, AND PROGRAM

(71) Applicant: Microwave Chemical Co., Ltd., Osaka (JP)

(72) Inventor: Yasunori Tsukahara, Osaka (JP)

(73) Assignee: Microwave Chemical Co., Ltd., Osaka (JP)

( * ) Notice: Subject to any disclaimer, the term of this patent is extended or adjusted under 35 U.S.C. 154(b) by 264 days.

(21) Appl. No.: 18/254,226

(22) PCT Filed: Nov. 30, 2021

(86) PCT No.: PCT/JP2021/043757

§ 371 (c)(1),
(2) Date: Jan. 3, 2024

(87) PCT Pub. No.: WO2022/114206

PCT Pub. Date: Jun. 2, 2022

(65) Prior Publication Data

US 2024/0310296 A1 Sep. 19, 2024

(30) Foreign Application Priority Data

Nov. 30, 2020 (JP) ................................. 2020-198074

(51) Int. Cl.
G01N 22/00 (2006.01)
H05B 6/70 (2006.01)
H05B 6/80 (2006.01)

(52) U.S. Cl.
CPC ............. G01N 22/00 (2013.01); H05B 6/705 (2013.01); H05B 6/806 (2013.01)

(58) Field of Classification Search
CPC ......... G01N 22/00; H05B 6/705; H05B 6/806

(Continued)

(56) References Cited

U.S. PATENT DOCUMENTS 5,648,038 A * 7/1997 Fathi ...................... H05B 6/705
324/636
6,480,141 B1 11/2002 Toth et al.
(Continued)

FOREIGN PATENT DOCUMENTS

CN 1542437 A 11/2004
CN 1880947 A 12/2006
(Continued)

OTHER PUBLICATIONS

Notification of Reasons for Refusal dated Oct. 12, 2021, from corresponding Japanese Application No. 2021-121214.

(Continued)

*Primary Examiner* — Raul J Rios Russo

(74) *Attorney, Agent, or Firm* — Troutman Pepper Locke LLP

(57) ABSTRACT

A state detection device capable of detecting a state of an apparatus is provided. A state detection device includes an acquisition unit that acquires observation information including information regarding a resonance frequency of microwaves acquired by introducing microwaves into a first apparatus, which is the target of state detection, while sweeping the frequency; a detection unit that detects the state of the first apparatus by comparing the observation information with reference information including information regarding a resonance frequency of microwaves introduced into a second apparatus in a reference state; and an output unit that performs output in accordance with a detection result of the detection unit.

10 Claims, 8 Drawing Sheets

(58) Field of Classification Search
USPC ........................................................... 324/642
See application file for complete search history.

(56) References Cited

U.S. PATENT DOCUMENTS

| | | | | |
|---|---|---|---|---|
| 8,384,396 | B2 * | 2/2013 | Bromberg | G01N 22/00 |
| | | | | 324/641 |
| 10,088,436 | B2 | 10/2018 | Ben Haim et al. | |
| 10,700,690 | B2 | 6/2020 | Maki | |
| 2004/0189324 | A1 | 9/2004 | Peters et al. | |
| 2006/0288782 | A1 | 12/2006 | Sawamoto et al. | |
| 2007/0148063 | A1 | 6/2007 | Terada et al. | |
| 2010/0102828 | A1 | 4/2010 | Brombert et al. | |
| 2012/0097088 | A1 | 4/2012 | Guerrier | |
| 2013/0025350 | A1 | 1/2013 | Nagata et al. | |
| 2013/0080098 | A1 | 3/2013 | Hadad et al. | |
| 2013/0127478 | A1 | 5/2013 | Brombert et al. | |
| 2013/0206752 | A1 * | 8/2013 | Moon | H05B 6/64 |
| | | | | 219/745 |
| 2017/0204757 | A1 * | 7/2017 | Imada | H05B 6/70 |
| 2018/0127880 | A1 * | 5/2018 | Kotani | C23C 16/345 |

FOREIGN PATENT DOCUMENTS

| | | | |
|---|---|---|---|
| CN | 102227619 | A | 10/2011 |
| CN | 103153657 | A | 6/2013 |
| CN | 103843456 | A | 6/2014 |
| CN | 106209078 | A | 12/2016 |
| CN | 110530898 | A | 12/2019 |
| JP | H02272326 | A | 11/1990 |
| JP | 2007175587 | A | 7/2007 |
| JP | 2010-101789 | A | 5/2010 |
| JP | 2010-276416 | A | 12/2010 |
| JP | 2012-507660 | A | 3/2012 |
| JP | 2012-526698 | A | 11/2012 |
| JP | 2018-169082 | A | 11/2018 |
| JP | 2019-158769 | A | 9/2019 |
| JP | 2020040159 | A | 3/2020 |
| WO | 2011/092889 | A1 | 8/2011 |
| WO | 2015/064370 | A1 | 5/2015 |

OTHER PUBLICATIONS

Decision of Refusal dated Mar. 1, 2022, from corresponding Japanese Application No. 2021-121214.

Takaaki Matsushima et al. "Research on Improvement in the Response Speed and Feature of Phase and Amplitude Controled Magnetron", The Institute of Electronics, Information and Communication Engineers, Technical Report of IEICE SPS2005-12 (Feb. 2006).

International Search Reported (English translation) dated Feb. 8, 2022, from corresponding International Application No. PCT/JP2021/043757.

Extended European Search Report and Opinion dated Oct. 22, 2024, from corresponding European Application No. 21898177.7.

Notice of Reasons for Refusal issued in corresponding Japanese Patent Application No. 2022-565498, dated Sep. 9, 2025 (Including English machine translation).

Decision of Refusal issued in corresponding Japanese Patent Application No. 2022 - 565498, dated Mar. 17, 2026 (including Machine English Translation).

Non-final Rejection issued in corresponding Taiwan Patent Application No. 110144638, dated Jan. 15, 2026 (including Machine English Translation).

First Office Action issued in corresponding Chinese Patent Application No. 202180091099.9, dated May 1, 2026 (including Machine English Translation).

* cited by examiner

STATE DETECTION DEVICE, STATE DETECTION METHOD, AND PROGRAM

CROSS REFERENCE TO RELATED APPLICATIONS

This is a U.S. national phase application under 35 U.S.C. 371 of International Patent Application No. PCT/JP2021/043757, filed Nov. 30, 2021, which claims benefit of priority to Japanese Patent Application No. 2020-198074, filed Nov. 30, 2020. The entire contents of these applications are hereby incorporated by reference.

FIELD OF THE INVENTION

The present invention relates to a state detection device, a state detection method, and a program for detecting the state of an apparatus with use of information regarding a resonance frequency of microwaves.

BACKGROUND

Conventionally, the state of an apparatus such as a machine has been estimated using a measurement value from a sensor installed in the apparatus. For example, the temperature measured in the vicinity of a reaction device is used to detect an abnormal state of the temperature of the reaction device (see JP 2007-175587).

However, the technique described in Japanese Patent Application No. 2007-175587 uses the result of a measurement of a predetermined measurement amount taken at a predetermined location, and therefore it has not been possible to appropriately detect an abnormality in the case where the result is an unanticipated amount or in the case where the result is an anticipated amount but the abnormality is occurring at an unanticipated location. More generally, a state not anticipated in advance is difficult to detect with conventional techniques. Examples of unanticipated states include a reactor for chemical reaction being contaminated with foreign matter, reaction delay, gas generation, and deformation of the reactor.

The present invention has been made in view of such problems, and an object of the present invention is to enable the detection of a wider variety of states than conventionally possible, including states not anticipated in advance, in a state detection device, a state detection method, and a program for detecting the state of an apparatus.

SUMMARY

In order to achieve the aforementioned object, a state detection device according to an aspect of the present invention includes: an acquisition unit configured to acquire observation information including information regarding one or a plurality of resonance frequencies of first microwaves introduced into a first apparatus that is a target of state detection; and a detection unit configured to detect a state of the first apparatus by comparing the observation information with reference information including information regarding one or a plurality of resonance frequencies of second microwaves introduced into a second apparatus in a reference state, the reference information being stored before acquisition of the observation information, wherein the detection unit detects the state of the first apparatus in a case where the reference information and the observation information do not match with respect to a resonance frequency.

Also, in the state detection device according to an aspect of the present invention, the state detection device may be a server on an IP network.

Also, in the state detection device according to an aspect of the present invention, the reference information may include a first absorption spectrum of microwaves, and the observation information may include a second absorption spectrum of microwaves.

Also, in the state detection device according to an aspect of the present invention, the observation information may include a plurality of pieces of time-series observation data, and the reference information may include a plurality of pieces of time-series reference data.

Also, in the state detection device according to an aspect of the present invention, the state of the first apparatus that is to be detected may be at least any of an abnormality in an amount or a shape of a substance in the first apparatus, an abnormality in a temperature in the first apparatus, and an abnormality in a shape of the first apparatus.

Also, the state detection device according to an aspect of the present invention may further include an output unit configured to perform output related to control of the first apparatus in accordance with a detection result of the detection unit.

Also, the state detection device according to an aspect of the present invention may further include an irradiation unit configured to irradiate a space in the first apparatus with microwaves while sweeping a frequency, and the acquisition unit may acquire the observation information by observing microwaves in the space.

Also, in the state detection device according to an aspect of the present invention, the second apparatus may include at least one apparatus among the first apparatus and one or a plurality of apparatuses different from the first apparatus, and the reference information may be generated based on data obtained from the at least one apparatus.

Also, a state detection method according to an aspect of the present invention includes the steps of: acquiring observation information including information regarding one or a plurality of resonance frequencies of first microwaves introduced into a first apparatus that is a target of state detection; and detecting a state of the first apparatus by comparing the observation information with reference information including information regarding one or a plurality of resonance frequencies of second microwaves introduced into a second apparatus in a reference state, the reference information being stored before acquisition of the observation information, and furthermore detecting the state of the first apparatus in a case where the reference information and the observation information do not match.

Also, a program according to an aspect of the present invention is for causing a computer to execute the steps of: acquiring observation information including information regarding one or a plurality of resonance frequencies of first microwaves introduced into a first apparatus that is a target of state detection; and detecting a state of the first apparatus by comparing the observation information with reference information including information regarding one or a plurality of resonance frequencies of second microwaves introduced into a second apparatus in a reference state, the reference information being stored before acquisition of the observation information, and furthermore detecting the state of the first apparatus in a case where the reference information and the observation information do not match.

The state detection device, the state detection method, and the program according to aspects of the present invention make use of information regarding the resonance frequency of microwaves, thus making it possible to detect a wider variety of states than conventionally possible for an apparatus whose state is to be detected.

DETAILED DESCRIPTION

Figure 1:
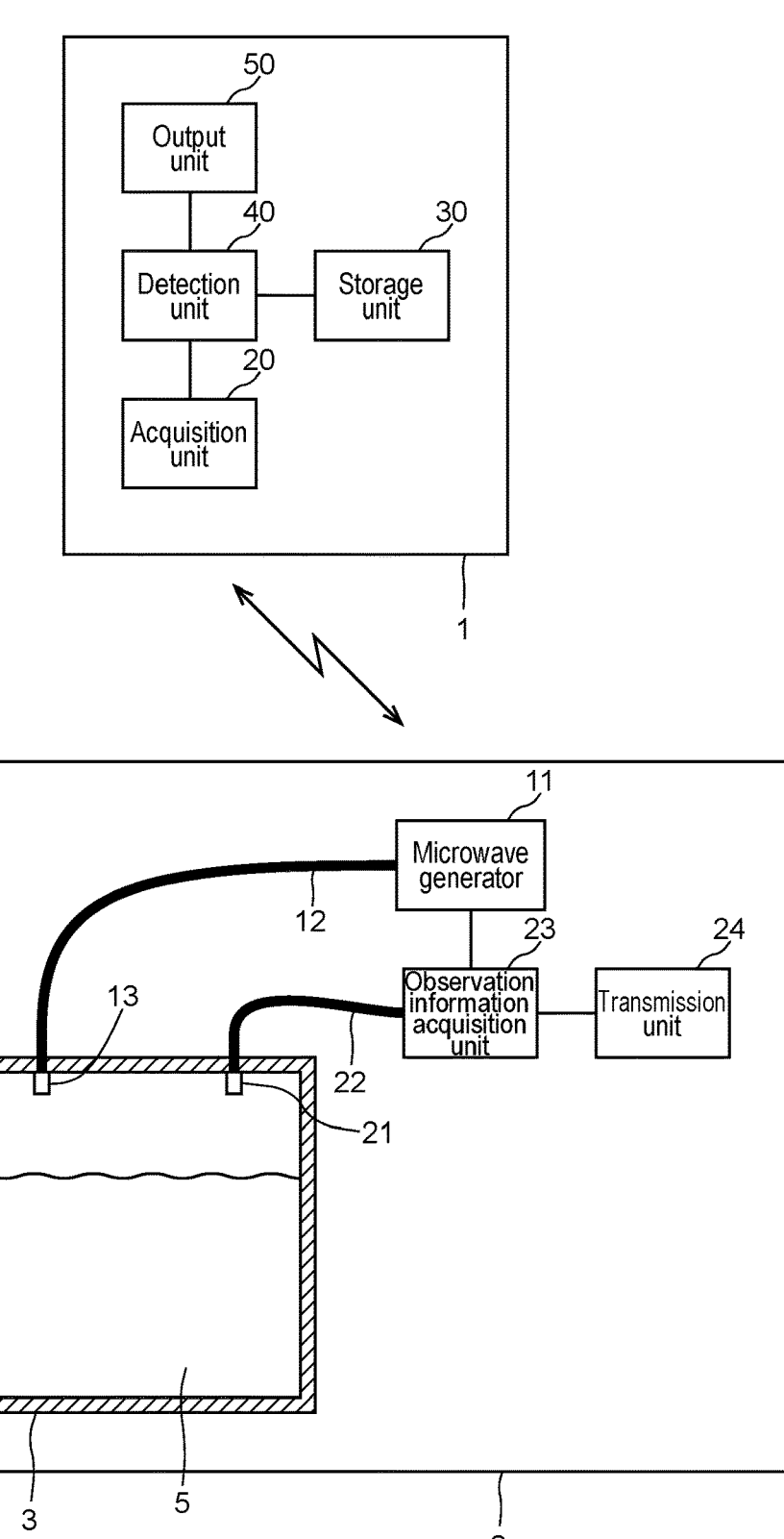
FIG. 1 is a schematic diagram showing a configuration of a state detection device according to a first embodiment of the present invention.

Hereinafter, a state detection device and a state detection method according to aspects of the present invention will be described by way of example of embodiments. Note that in the following embodiments, constituent elements and steps denoted by the same reference numerals are the same or correspond to each other, and repetitive descriptions may be omitted for such constituent elements and steps.

First Embodiment

A state detection device and a state detection method according to the present embodiment detect the state of an apparatus with use of observation information including information regarding the resonance frequency of microwaves.

FIG. 1 is a schematic diagram showing the configuration of a state detection device 1 according to the present embodiment. The state detection device 1 according to the present embodiment may include an acquisition unit 20 that acquires observation information including information regarding the resonance frequency of microwaves introduced into an apparatus whose state is to be detected (hereinafter referred to as a "first apparatus"), a detection unit 40 that detects the state of the first apparatus by comparing the observation information with reference information including information regarding the resonance frequency of microwaves introduced into an apparatus in a reference state (hereinafter referred to as a "second apparatus"), and if necessary, a storage unit 30 in which reference information is stored, and an output unit 50 that performs output in accordance with the result of detection of the state of the first apparatus. It is assumed here that the state detection device 1 shown in FIG. 1 is a server on a network in which observation information acquired by an observation information acquisition device 2 is received via a wired or wireless communication line. The communication line may be an IP network such as the Internet or an intranet, for example. The server may also be an instance on a private cloud or a public cloud.

Figure 2:
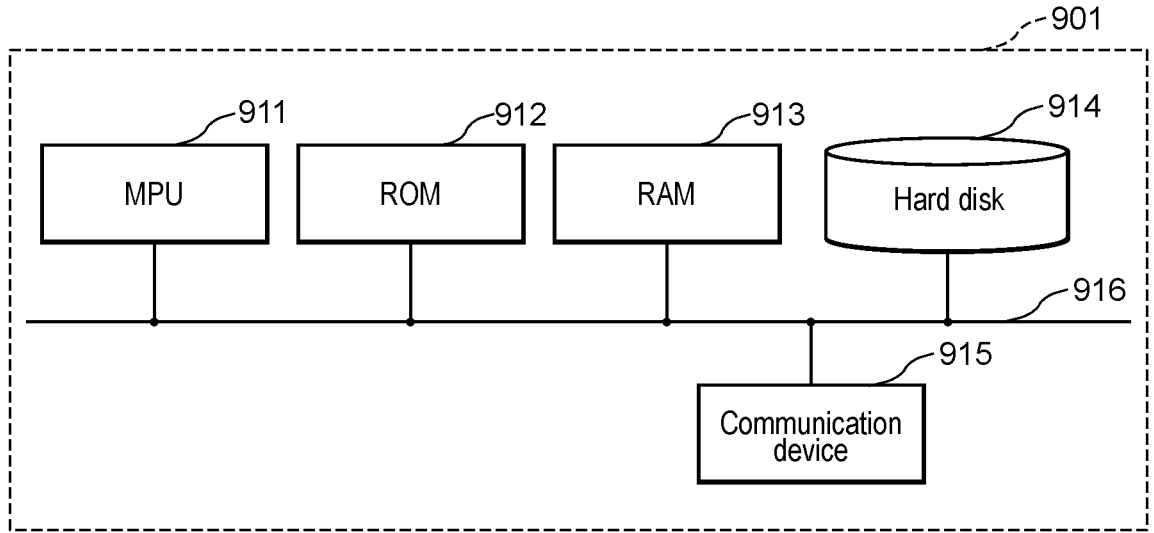
FIG. 2 is a diagram showing an example of a configuration of a computer system according to the first embodiment.

FIG. 2 is a diagram showing the configuration of a computer system 901 that implements the state detection device 1 by executing a program. The state detection device 1 can be realized by computer hardware and a computer program executed on the computer hardware. In FIG. 2, the computer system 901 includes: an MPU (Micro Processing Unit) 911; a ROM 912 for storing a program such as a boot-up program; a RAM 913 that is connected to the MPU 911, temporarily stores program instructions, and provides temporary storage space; a hard disk 914 that stores an application program, a system program, and data; a communication device 915 for communicating with an external device via a network; and a bus 916 that connects the MPU 911, the ROM 912, and the like to each other. The communication device 915 may be a network card or the like. A program for realizing the state detection device 1 may be provided to the computer system 901 via a network, for example, or may be provided to the computer system 901 via a non-transitory computer-readable recording medium such as a DVD or a semiconductor memory. The recording medium may be a non-transitory tangible medium, for example.

The observation information acquisition device 2 includes a microwave generator 11 for generating microwaves, and if necessary, a coaxial cable 12 for transmitting the generated microwaves, and an antenna 13 for emitting the transmitted microwaves. The observation information acquisition device 2 further includes an antenna 21 for receiving microwaves in the space in the first apparatus, a coaxial cable 22 for transmitting the received microwaves, an observation information acquisition unit 23 that acquires observation information with use of the transmitted microwaves, and a transmission unit 24 that transmits the acquired observation information to the state detection device 1.

A first apparatus having a microwave irradiation space is the apparatus whose state is to be detected. The first apparatus is normally an apparatus whose state can change. The first apparatus may be an apparatus that performs processing such as heating, drying, or chemical reacting in a space in a device in order to perform some kind of production, such as a production device used in a production process. The production device is not particularly limited, and may be a reactor, a kiln, a drying device for drying, a freeze-drying device for freeze-drying, or a device that includes a conveyor, for example. A production device that performs processing such as chemical reacting may have a raw material, a catalyst, an intermediate product, a final product, or the like, or any combination thereof in a space within the device, for example. Also, the first apparatus may be an apparatus that performs processing such as heating, burning, drying, breakdown, detoxification, or sterilization in a space in the apparatus in order to treat waste, such as a waste treatment device used in waste treatment. The waste treatment device may have untreated waste material, a catalyst, treated waste material, or the like, or any combination thereof in the space inside the apparatus, for example. The space in the first apparatus may be a microwave confined space. The space may be a space such as the interior of a vessel, the interior of a cavity, or the interior of a pipe, where processing or the like is performed in the first apparatus, for example. In the present embodiment, it is assumed that the first apparatus is a cavity 3, which is a production device, and the observation information acquisition device 2 includes the cavity 3. Also, it is assumed that the space inside the cavity 3 where a content 5 exists is irradiated with microwaves. It is preferable that microwaves do not leak from the space irradiated with microwaves in the first apparatus. For this reason, it is normally preferred that microwaves cannot pass through walls of the cavity 3. The cavity 3 may be constituted using a microwave reflective material. The microwave reflective material may be a metal, for example. The metal is not particularly limited, and may be stainless steel, carbon steel, nickel, a nickel alloy, copper, a copper alloy, or the like. The content 5 may be a solid, a liquid, or a gas, for example. In the present embodiment, a case will be mainly described in which the content 5 is a liquid, and is to be subjected to processing such as a chemical reaction.

Note that in the case of heating the content present in the space in the first apparatus, the heating may be microwave heating or conventional heating using a heater or the like. In the case where microwave heating is performed, the frequency of the microwaves for microwave heating and the frequency of the microwaves output from the antenna 13 may be different from each other, the modes of the microwaves may be different, or the microwaves may be emitted through time-division, for example. Emitting the microwaves through time-division means the microwaves are not applied at the same time.

The microwave generator 11 generates microwaves. The microwave generator 11 may generate microwaves using a magnetron, a klystron, or a semiconductor device, for example. Generating microwaves using a semiconductor element may mean oscillating microwaves with use of a semiconductor element, or amplifying microwaves with use of a semiconductor element, for example. The microwave generator 11 is for generating microwaves while sweeping the frequency in a predetermined frequency band, and therefore it is preferable that the microwave generator 11 generates microwaves using a semiconductor element. Note that in the case where the microwave generator 11 generates microwaves with use of a magnetron, a configuration is possible in which microwaves synchronized with the frequency of a reference signal are generated using injection locking, and frequency sweeping is performed by changing the frequency of the reference signal. The microwave frequency band may be around 915 MHz, 2.45 GHZ, 5.8 GHz, 24 GHz, or another frequency band in the range of 300 MHz to 300 GHz, for example. The microwave generator 11 may generate microwaves while sweeping the frequency in a relatively narrow frequency band such as a band from 2.4 GHz to 2.5 GHZ. Also, the microwave generator 11 may generate microwaves while sweeping the frequency in a relatively wide frequency band such as a band from 300 MHz to 20 GHz. Note that frequency sweeping may be sweeping in which the frequency is increased or sweeping in which the frequency is decreased, for example. The intensity and frequency of the generated microwaves may be appropriately controlled by a controller (not shown).

Microwaves generated by the microwave generator 11 are transmitted to the antenna 13 by the coaxial cable 12. The antenna 13 emits the microwaves transmitted by the coaxial cable 12. The space in the first apparatus is irradiated with the microwaves emitted from the antenna 13. Note that in the present embodiment, a case will be mainly described in which the microwaves generated by the microwave generator 11 are transmitted using the coaxial cable 12 and the antenna 13 to irradiate the space in the first apparatus, but the microwaves generated by the microwave generator 11 may be transmitted by a waveguide to irradiate the space in the first apparatus.

Figure 4:
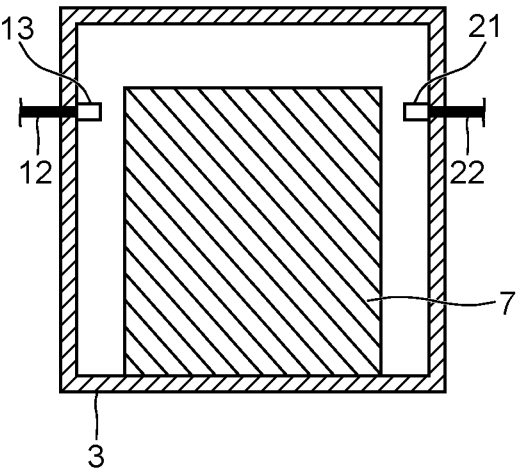
FIG. 4 is a diagram for describing an example of microwave observation in the first embodiment.

The microwaves in the space in the first apparatus received by the antenna 21 may be microwaves reflected by the microwave irradiation target, microwaves that passed through the microwave irradiation target, or both, for example. For example, in the case where the antenna 13 for emitting microwaves, the content 5, and the antenna 21 for receiving microwaves are arranged as shown in FIG. 1, the microwaves received by the antenna 21 are mainly microwaves reflected by the content 5 and the inner wall of the cavity 3. On the other hand, in the case where the antenna 13 for emitting microwaves, a content 7, and the antenna 21 for receiving microwaves are arranged as shown in FIG. 4, and furthermore the content 7 partially transmits microwaves, then the microwaves received by the antenna 21 include microwaves that have passed through the content 7. Note that the antenna 21 may be a coaxial waveguide converter antenna, for example.

The observation information is information that includes information regarding the resonance frequency of the microwaves introduced into the first apparatus. This observation information may be the overall resonance frequency of the microwave confined space in the first apparatus. Also, if a raw material, a catalyst, an intermediate product, a final product, untreated waste material, treated waste material, or the like, or any combination thereof exists in the space, the observation information also includes information regarding the resonance frequencies of all objects present in the space. The observation information may be information indicating a resonance frequency, for example. In this case, the observation information indicates one or more resonance frequencies. Also, the observation information may include information indicating a resonance frequency characteristic such as the half width or the Q value, for example. The observation information may be a microwave absorption spectrum, for example. In this case, the observation information indicates the degree of absorption of microwaves for each frequency, that is, the intensity of microwaves for each frequency. In the microwave absorption spectrum, a frequency with a lower microwave intensity is a frequency with a higher microwave absorption. Also, the observation information may be information indicating change in the resonance frequency along a time series, for example. For example, in the case where the resonance frequency changes in accordance with predetermined processing (e.g., heating, drying, or chemical reaction) performed in the first apparatus, the observation information is information indicating the change (e.g., information indicating that the resonance frequency changed from N1 to N2).

Figure 5:
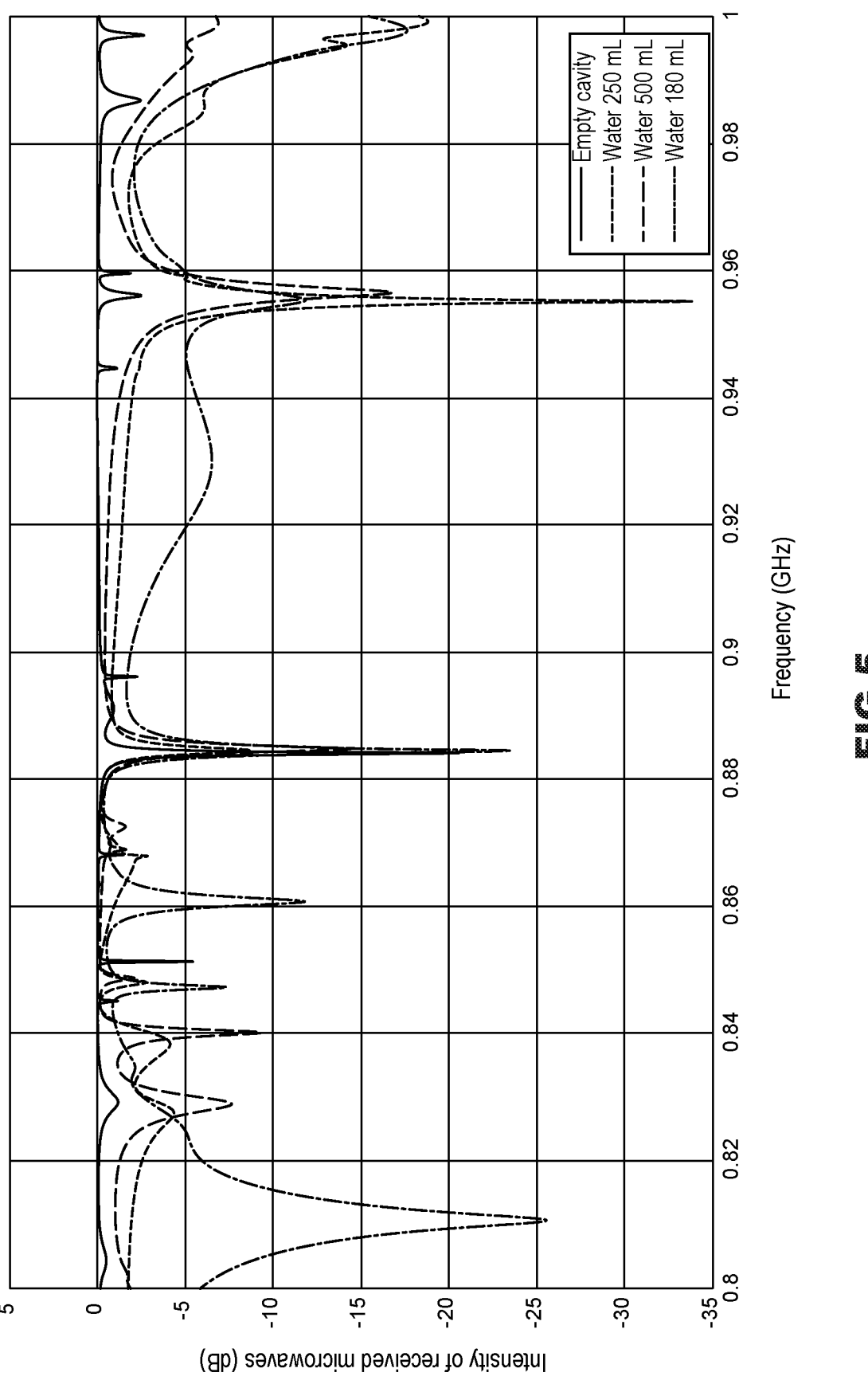
FIG. 5 is a diagram showing an example of microwave absorption spectrums in the first embodiment.

FIG. 5 shows experiment results for microwave absorption spectrums obtained by irradiating the inside of the cavity with microwaves. In this experiment, the reflected wave intensity was measured when emitting microwaves into an empty cavity, a cavity with 250 ml of water, a cavity with 500 mL of water, and a cavity with 1000 mL of water. In FIG. 5, the horizontal axis indicates the frequency, and the vertical axis indicates the intensity of received microwaves. FIG. 5 shows observation information obtained for four cases of irradiating the inside of the cavity with microwaves from 0.8 GHz to 1 GHz. As shown in FIG. 5, the intensity of received microwaves is low at some frequencies, such as around 0.885 GHz and around 0.955 GHZ. In this way, the frequency at which the microwaves intensity is low is the resonance frequency. Also, the resonance frequency changes according to the amount of water in the cavity. For example, in the empty cavity containing no water, there are resonance frequencies near 0.895 GHz and 0.945 GHz, but these resonance frequencies disappear when the cavity is filled with water. Also, the resonance frequency near 0.84 GHz for the cavity containing 500 mL of water and the resonance frequencies near 0.81 GHz and 0.86 GHz for the cavity containing 1000 mL of water are resonance frequencies that do not exist for the cavities with other volumes of water. Also, the resonance frequency around 0.955 GHz for the cavity containing 250 mL of water has a significantly lower microwave intensity than the cavities with other volumes of water. In this way, it can be seen that a change in the state of the cavity, that is to say a change in the amount of water in the cavity, can be detected based on the observation information regarding the resonance frequency.

The resonance frequency is determined by the structure of the space in the first apparatus irradiated with microwaves and the substances present in the space. For example, the resonance frequency is determined by the internal structure of the cavity 3 and the content 5. Therefore, even if the internal structure of the cavity 3 does not change, the resonance frequency can change due to a change in the content 5 in terms of temperature, amount, substance, or the like. For this reason, by observing a change in the resonance frequency, it becomes possible to know a state of the content 5, such as the temperature of the content 5, the amount of the content 5, or the composition of a substance contained in the content 5.

The observation information acquisition unit 23 acquires observation information by receiving microwaves that were received by the antenna 21 and transmitted through the coaxial cable 22. Observation information may be acquired by first acquiring a microwave absorption spectrum. The microwave absorption spectrum may be acquired by a sweep technique or by a Fourier transform technique, for example. In the case of a sweep technique, the reception frequency is swept in synchronization with sweeping of the frequency of microwaves generated by the microwave generator 11, and the microwave reception intensity is measured for corresponding frequencies. In the case of a Fourier transform technique, received signals are recorded while the microwave generator 11 generates microwaves with a sweeping frequency, and then the microwave reception intensity is measured for corresponding frequencies by performing Fourier transform. In the case of performing broadband reception, it is preferable to acquire the microwave absorption spectrum by a sweep technique. On the other hand, in the case of performing narrowband reception, the microwave absorption spectrum may be acquired by a Fourier transform technique, or the microwave absorption spectrum may be acquired by a sweep technique. Note that sweep techniques and Fourier transform techniques are both already known as signal observation methods that use a spectrum analyzer, and detailed descriptions thereof will be omitted.

In the case where the observation information is a microwave absorption spectrum, the observation information acquired by the observation information acquisition unit 23 may be a microwave absorption spectrum acquired by a sweep technique or a Fourier transform technique, for example.

In the case where the observation information is information indicating a microwave resonance frequency, the observation information acquisition unit 23 may specify a resonance frequency from a microwave absorption spectrum acquired by a sweep technique or a Fourier transform technique, and generate observation information that indicates the resonance frequency, for example. Note that the resonance frequency may be specified by specifying an extreme value in the microwave absorption spectrum, for example. In this case, the observation information acquisition unit 23 may acquire information indicating a resonance frequency characteristic, such as a half width, for each resonance frequency, and such information may also be included in the observation information, for example.

In the case where the observation information is information indicating change in the resonance frequency along a time series, the observation information acquisition unit 23 may acquire observation information indicating change over time in the resonance frequency by repeatedly, along a time series, specifying a resonance frequency from a microwave absorption spectrum acquired by a sweep technique or a Fourier transform technique, and specifying change in the specified resonance frequency along the time series. The resonance frequency may be specified periodically (i.e., at regular intervals, such as every 1 second, 5 seconds, 1 minute, 10 minutes, or 1 hour, for example), or may be specified irregularly. Note that in the case of repeatedly specifying the resonance frequency, microwave irradiation and microwave observation are performed each time.

The observation information acquisition unit 23 may acquire observation information that includes one piece of observation data for the first apparatus, or may acquire observation information including a plurality of pieces of observation data. In the latter case, the observation information acquisition unit 23 may acquire observation information that includes a plurality of pieces of time-series observation data, for example. Observation information that includes a plurality of pieces of time-series observation data may be acquired periodically or irregularly, for example. Note that in the case where a plurality of pieces of observation data are acquired, microwave irradiation and microwave observation are performed each time the observation data is acquired. The observation data may be data indicating a resonance frequency, or may be a microwave absorption spectrum, for example.

The acquisition of observation information indicating change in the resonance frequency along a time series or the acquisition of a plurality of pieces of observation data along a time series may be performed by the state detection device 1. In this case, the observation information acquisition device 2 may repeatedly acquire information indicating a resonance frequency or observation information indicating a microwave absorption spectrum, and transmit the acquired information to the state detection device 1.

Note that although the case where microwave emission and microwave reception are performed using different antennas 13 and 21 is mainly described in the present embodiment, microwave emission and microwave reception may be performed using a single antenna. In this case, microwaves are emitted from one antenna, and microwaves are received by the same antenna. In this case, a directional coupler may be used to separate the received microwave signals, for example.

The transmission unit 24 transmits the observation information acquired by the observation information acquisition unit 23 to the state detection device 1 via a wired or wireless communication line. Also, the transmission unit 24 may transmit an apparatus identifier for identifying the first apparatus for which the observation information was obtained along with the observation information to the state detection device 1. The apparatus identifier may be stored in a recording medium (not shown), and the transmission unit 24 may read the apparatus identifier and transmit it together with the observation information.

The acquisition unit 20 of the state detection device 1 acquires observation information regarding the first apparatus. Here, the case where the acquisition unit 20 receives observation information acquired by another device will be mainly described, and another case, such as the case of acquiring observation information by observing microwaves in a space in the first apparatus, will be described later. In addition to the observation information, the acquisition unit 20 may receive an apparatus identifier that specifies the first apparatus for which the observation information was acquired. Although FIG. 1 shows a case where the state detection device 1 receives observation information from one observation information acquisition device 2, it goes without saying that the state detection device 1 may receive observation information from two or more observation information acquisition devices 2. The acquisition unit 20 may receive the observation information transmitted from the observation information acquisition device 2 by a communication device for reception (e.g., a modem or a network card).

The storage unit 30 stores reference information regarding a second apparatus in a reference state. The reference information is information that includes information regarding the resonance frequency of microwaves introduced into the second apparatus in a reference state. Note that the reference information may or may not be information similar to the observation information. In the former case, both the observation information and the reference information may be information indicating a microwave resonance frequency, may be a microwave absorption spectrum, or may be information indicating change in the resonance frequency along a time series, for example. In the latter case, either the observation information or the reference information may be information indicating a microwave resonance frequency, and the other one may be a microwaves absorption spectrum or information indicating change in the resonance frequency along a time series, for example. Also, in the case where the acquisition unit 20 acquires observation information that includes a plurality of pieces of time-series observation data, reference information that includes a plurality of pieces of time-series reference data may be stored in the storage unit 30 as well. In this case, the time interval between the pieces of time-series reference data stored in the storage unit 30 may be the same as, or similar to, the time interval between the pieces of time-series observation data acquired by the acquisition unit 20. The reference data may or may not be information similar to the observation data.

Also, the reference information may be information acquired using the first apparatus itself (i.e., the first and second apparatuses may be the same), or may be information acquired using a different second apparatus having the same configuration as the first apparatus. Having the same configuration may mean that the configurations of the first and second apparatuses are strictly the same, or that the configurations of the apparatuses are similar to each, for example. Note that in the latter case, it is preferable that the information regarding the microwave resonance frequency acquired by the two apparatuses is similar when the two apparatuses are in the same state. Also, the second apparatus may include a plurality of second apparatuses, and the reference information may be generated based on data obtained from the respective apparatuses for example. In this way, one or more apparatuses included in the second apparatus may be at least either the first apparatus or one or more apparatuses different from the first apparatus. The reference information may be generated by machine learning performed based on data obtained from at least one or more of such apparatuses.

One example of an apparatus that is included in the second apparatus but different from the first apparatus is an apparatus that performs processing for the same purpose as the first apparatus and has a smaller internal volume than the first apparatus. More specifically, in the case where both the first apparatus and the second apparatus are production devices, if the volume of the first production device is 1000 L, the volume of the second production device is 10 L or 100 L, for example. If the volume is smaller than that of the first apparatus, it is possible to acquire data under various conditions that are difficult to acquire with the first apparatus, and reference information can be easily generated by addition to or replacement of data obtained from the first apparatus. An apparatus that is included in the second apparatus but different from the first apparatus may be part of the first apparatus, and data obtained for such a part may be used to generate the reference information.

The storage unit 30 may store reference information corresponding to a normal state of the second apparatus, reference information corresponding to an abnormal state of the second apparatus, or reference information corresponding to another state, for example. In other words, the reference state may be a normal state, an abnormal state, or another state, for example. Also, reference information corresponding to the first apparatus identified by an apparatus identifier may be stored in the storage unit 30 in association with that apparatus identifier. The reference information corresponding to the first apparatus is the reference information used in detection of the state of the first apparatus.

There are no limitations on the process by which reference information is stored in the storage unit 30. For example, reference information may be stored in the storage unit 30 via a recording medium, or reference information received via a communication line or the like may be stored in the storage unit 30. Also, the reference information stored in the storage unit 30 may be information regarding a microwave resonance frequency, which was acquired by the acquisition unit 20 when the first apparatus was in a reference state. In this case, the first and second apparatuses are the same apparatus. Also, in this case, the reference information may be accumulated in the storage unit 30 by the acquisition unit 20. Also, although the case where reference information is stored in association with an apparatus identifier in the storage unit 30 is mainly described as an example in the present embodiment, this is not required. For example, in the case where a database for managing reference information is stored in a storage medium accessible by the state detection device 1, the state detection device 1 may read out, from the storage medium, reference information corresponding to an apparatus identifier received by the acquisition unit 20 and compare the read-out information with observation information. In this case, the storage unit 30 may temporarily store the reference information read from the storage medium for processing for comparison with the observation information. The storage medium accessible by the state detection device 1 may exist on a network, for example. The storage unit 30 is preferably implemented by a non-volatile recording medium, but may be implemented by a volatile recording medium. The recording medium may be a semi-conductor memory, a magnetic disk, or an optical disk, for example.

Figure 6:
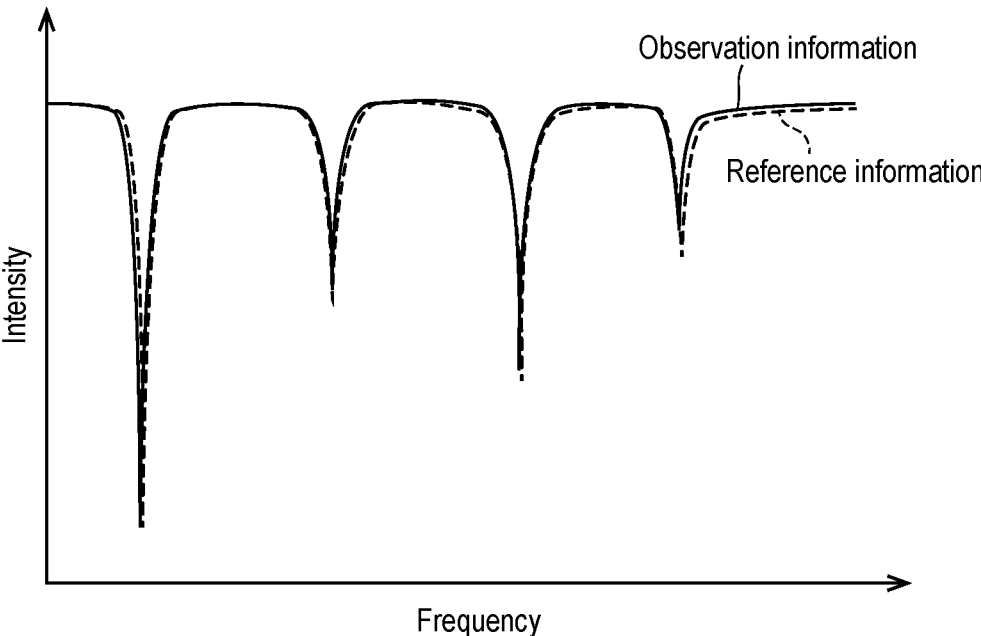
FIG. 6 is a diagram showing an example of reference information and observation information in the first embodiment.
Figure 7:
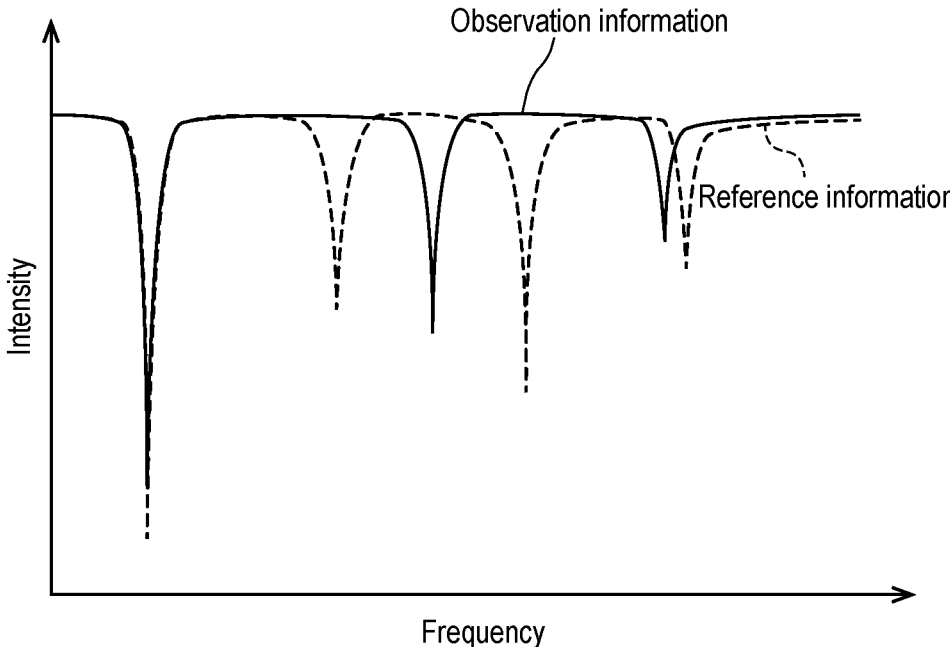
FIG. 7 is a diagram showing an example of reference information and observation information in the first embodiment.

The detection unit 40 detects the state of the first apparatus by comparing the reference information and the observation information with each other. Note that in the case where observation information and an apparatus identifier are received by the acquisition unit 20, and furthermore a plurality of pieces of reference information associated with apparatus identifiers are stored in the storage unit 30, the detection unit 40 may compare the observation information received by the acquisition unit 20 with the piece of reference information in the storage unit 30 that is associated with the same apparatus identifier as that of the observation information that was received. In the case where the reference information and the observation information match each other, the detection unit 40 may detect that the state of the first apparatus is the state corresponding to the reference information. For example, a configuration is possible in which, in the case where a plurality of pieces of reference information corresponding to the second apparatus are stored the storage unit 30, if reference information that matches the observation information is stored in the storage unit 30, the detection unit 40 detects that the state of the first apparatus is the state corresponding to the matching reference information. Note that whether or not the observation information and the reference information match each other may be determined depending on whether or not the degree of similarity between the two pieces of information is higher than a threshold value. For example, in the case where the degree of similarity between the observation information and the reference information is higher than the threshold value, the state corresponding to the reference information (e.g., abnormal state or normal state) may be detected as the state of the first apparatus. For example, in the case where reference information indicating an absorption spectrum corresponding to the normal state indicated by a dashed line in FIG. 6 is stored in the storage unit 30, and furthermore observation information indicating the absorption spectrum indicated by the solid line in FIG. 6 is acquired, it may be determined that the two match, and "normal" may be detected as the state of the first apparatus. Note that the absorption spectrums in FIGS. 6 and 7 are not actual measurement results.

Also, in the case where the observation information and the reference information stored in the storage unit 30 are different from each other, for example, the detection unit 40 may detect that the state of the first apparatus is different from the state corresponding to the reference information. Note that the observation information and the reference information being different from each other may mean that the observation information and the reference information do not match each other. For example, the detection unit 40 may detect an abnormality in the first apparatus if the observation information and the reference information corresponding to the normal state of the second apparatus are different from each other. For example, in the case where reference information indicating an absorption spectrum corresponding to the normal state indicated by a dashed line in FIG. 7 is stored in the storage unit 30, and furthermore observation information indicating the absorption spectrum indicated by the solid line in FIG. 7 is acquired, it may be determined that the two do not match each other, and "abnormal" may be detected as the state of the first apparatus. Note that in the case where a plurality of pieces of reference information corresponding to a certain state are stored in the storage unit 30, if the observation information is different from all of the of pieces of reference information, the detection unit 40 may detect that the state of the first apparatus is different from the states of the pieces of the reference information.

Next, an example of a method by which the detection unit 40 compares the reference information and the observation information with each other will be described. For example, in the case where both the reference information and the observation information are information indicating micro- wave resonance frequencies, the detection unit 40 may first specify a one-to-one correspondence between resonance frequencies based on the resonance frequencies included in the reference information and the resonance frequencies included in the observation information. Then, using the specified correspondence relationship, the detection unit 40 may acquire a degree of similarity that corresponds to the difference in resonance frequency in the correspondence relationship between the two pieces of information. The degree of similarity may be information indicating that the difference increases as the similarity between the reference information and the observation information decreases, for example. The detection unit 40 may then determine that the reference information and the observation information match in the case where the degree of similarity is greater than a threshold value, and determine that the reference information and the observation information do not match in the case where the degree of similarity is less than the threshold value. Note that in the case where the degree of similarity between the information is the same as the threshold value, it may be determined that the reference information and the observation information match each other, or it may be determined that they do not match each other. Also, in the case where the reference information and the observation information include information indicating resonance frequency characteristics together with resonance frequencies, regarding resonance frequencies in a correspondence relationship, the detection unit 40 may acquire a degree of similarity according to which the similarity decreases as the difference between the information indicating resonance frequency characteristics increases.

If a one-to-one correspondence relationship between resonance frequencies cannot be specified based on the resonance frequencies included in the reference information and the resonance frequencies included in the observation information, it may be determined that, in the observation information, rather than the resonance frequency included in the reference information having shifted, either the resonance frequency included in the reference information disappeared or a resonance frequency not included in the reference information was added, and the observation information and the reference information do not match with respect to that resonance frequency.

As another example, in the case where both the reference information and the observation information indicate microwave absorption spectrums, the detection unit 40 may acquire the degree of similarity between the two absorption spectrums, determine that the reference information and the observation information match in the case where the degree of similarity is greater than a threshold value, and determine that the reference information and the observation information do not match in the case where the degree of similarity is less than the threshold value. Note that in the case where the degree of similarity between the two absorption spectrums is the same as the threshold value, it may be determined that the reference information and the observation information match, or it may be determined that they do not match. Also, methods for acquiring the similarity between signals such as absorption spectrums are known, and detailed description thereof will be omitted.

As another example, in the case where both the reference information and the observation information are information indicating change in the resonance frequency along a time series, the detection unit 40 may acquire the degree of similarity between the changes in the resonance frequency indicated by the reference information and the observation information. For example, if the reference information indicates that the resonance frequency has changed from A1 to B1 and the observation information indicates that the resonance frequency has changed from A2 to B2, the detection unit 40 may acquire a degree of similarity that is higher as the difference between the resonance frequencies A1 and A2 is smaller, and that is higher the closer B1-A1 is to B2-A2. Then, it is determined that the reference information and the observation information match in the case where the degree of similarity is greater than the threshold value, and it is determined that the reference information and the observation information do not match in the case where the degree of similarity is less than the threshold value. Note that in the case where the degree of similarity is the same as the threshold value, it may be determined that the reference information and the observation information match, or it may be determined that they do not match.

Also, in the case where one of the pieces of information to be compared is information indicating change in the resonance frequency along a time series, and the other piece of information is information indicating a resonance frequency or a microwave absorption spectrum, the detection unit 40 may convert the information indicating a resonance frequency or the microwave absorption spectrum into information indicating change in the resonance frequency along a time series and then compare the two pieces of information. Also, in the case where one of the pieces of information to be compared is a resonance frequency and the other piece of information is an absorption spectrum, the detection unit 40 may acquire information regarding the resonance frequency from the absorption spectrum and then compare the two pieces of information.

In the case where observation information that includes a plurality of pieces of time-series observation data is acquired by the acquisition unit 20, and reference information that includes a plurality of pieces of time-series reference data is stored in the storage unit 30, the detection unit 40 may compare observation information that includes a plurality of pieces of time-series observation data with reference information that includes a plurality of pieces of time-series reference data. For example, in the case where there a plurality of pieces of reference data including reference data K1 at a time T1 (based on a reference time point at which processing such as heating or drying starts in the second apparatus), reference data K2 at a time T2, reference data K3 at a time T3, and the like, then observation data acquired at a time T1 (based on a reference time point at which processing starts in the first apparatus) may be compared with the reference data K1, observation data acquired at a time T2 may be compared with the reference data K2, and observation data acquired at a time T3 may be compared with the reference data K3. The result of integrating the results of comparison between the observation data pieces and the reference data pieces may be used as the result of comparison between observation information that includes a plurality of pieces of time-series observation data and reference information that includes a plurality of pieces of time-series reference data. For example, a representative value of the results of comparison between the observation data and the reference data may be used as the result of comparison between the observation information and the reference information. The representative value may be an average value, a median value, a maximum value, or a minimum value, for example. Note that in the case where the maximum value or the minimum value is used as the representative value, whichever one of the maximum value and the minimum value indicates a lower degree of similarity may be used as the representative value, for example. This is because even in the case where some sets of observation data and reference data have high similarity, if other sets have low similarity, the overall similarity of the sets is thought to be low.

The abnormality detected by the detection unit 40 may be an abnormality related to a substance in the first apparatus, an abnormality related to temperature, an abnormality related to shape, or the like. For example, in the case where a substance A and a substance B are inside the first apparatus, a chemical reaction is taking place in which a substance C is produced by the reaction between the substances A and B, and the proportion of the substance C is desirably 50% in a normal chemical reaction, then it is possible to detect an abnormality in which the proportion of the substance C is 30%. It is also possible to detect an abnormality such as non-uniform heating due to thermal runaway or the like. It is also possible to detect a shape abnormality, including a deficiency such as a crack in a pipe, a cavity, a container, or the like. Also, an abnormality in which a liquid content 5 is not being properly stirred can be detected by detecting that the shape of the liquid surface is different from a normal shape of the liquid surface. It is also possible to detect an abnormality in which a substance in the first apparatus is located where it does not exist in normal processing due to scattering or the like. Such anomalies can be detected by a change in the microwave resonance frequency from a normal state.

The output unit 50 performs output in accordance with the detection result of the detection unit 40. The output performed in accordance with the detection result of the detection unit 40 may be output of the detection result by the detection unit 40, or output pertaining to control of the first apparatus in accordance with the detection result. In the former case, it is the detection result that is output, for example. In the latter case, a control instruction corresponding to the detection result may be output, for example. More specifically, in the case where the detection result indicates that the state of the first apparatus is abnormal, the output unit 50 may perform control to stop processing (e.g., heating) in the first apparatus. As another example, in the case where the detection result indicates that the heating is uneven in the first apparatus, the output unit 50 may perform control to increase the stirring intensity of the first apparatus.

The output may be displayed on a display device (e.g., a liquid crystal display or an organic EL display), may be transmitted to a predetermined device via a communication line, may be printed by a printer, may be output as audio by a speaker, may be stored in a recording medium, or may be transferred to another constituent element. Note that the output unit 50 may or may not include a device for performing output (e.g., a display device, a communication device, or a printer). Also, the output unit 50 may be realized by hardware, or may be realized by software such as a driver for driving such devices.

Figure 3:
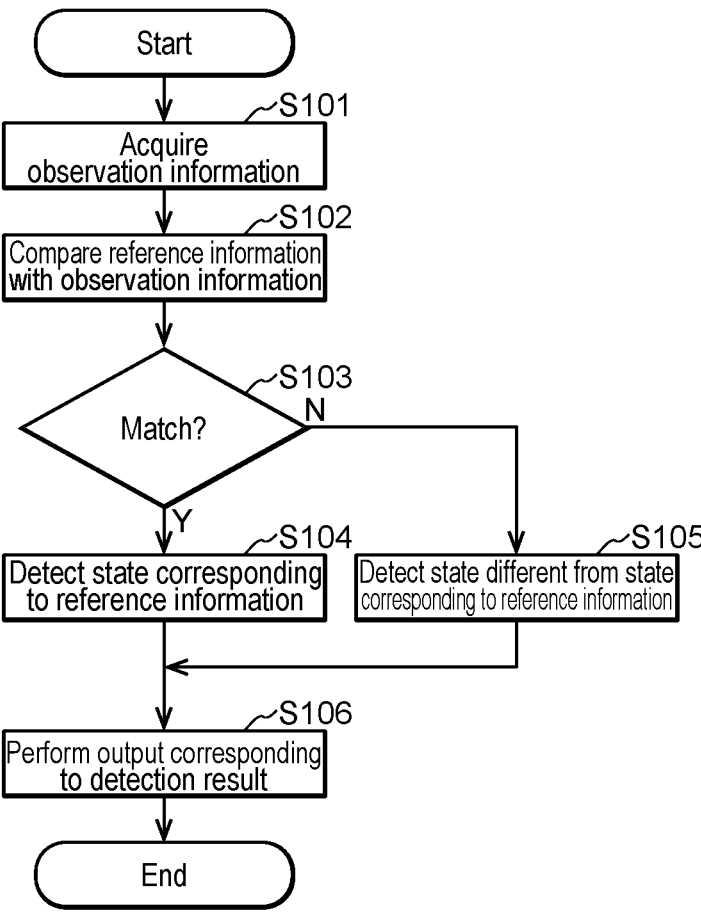
FIG. 3 is a flowchart showing a state detection method according to the first embodiment.

Next, the operation of the state detection device 1, that is to say a state detection method, will be described with reference to the flowchart of FIG. 3.

Step S101

The microwave generator 11 generates microwaves while sweeping the frequency. Then, the microwaves are transmitted by the coaxial cable 12 and emitted from the antenna 13 to irradiate the space in the first apparatus. Microwaves in the space are then received by the antenna 21 and transmitted by the coaxial cable 22. The observation information acquisition unit 23 receives the microwaves and acquires observation information. The transmission unit 24 transmits the observation information to the state detection device 1. The acquisition unit 20 of the state detection device 1 receives the observation information.

Step S102

The detection unit 40 compares the observation information acquired by the acquisition unit 20 with reference information stored in the storage unit 30. As described above, the observation information may be compared with the reference information that is associated with the apparatus identifier received by the acquisition unit 20. Note that in the case where a plurality of pieces of reference information that correspond to the apparatus identifier of the first apparatus are stored in the storage unit 30, each of the pieces of reference information may be compared with the observation information.

Step S103

If reference information that matches the observation information is stored in the storage unit 30, the processing proceeds to step S104, and if otherwise, the processing proceeds to step S105.

Step S104

The detection unit 40 detects, as the state of the first apparatus, the state that corresponds to the reference information that matches the observation information.

Step S105

The detection unit 40 detects, as the state of the first apparatus, a state different from the state that corresponds to the reference information stored in the storage unit 30.

Step S106

The output unit 50 performs output in accordance with the state detected by the detection unit 40. The series of processing for detecting the state of the first apparatus in accordance with the acquisition of the observation information then ends.

As described above, with the state detection device 1 according to the present embodiment, the state of the first apparatus can be detected with use of information regarding a microwave resonance frequency. Through this state detection, it is possible to detect states regarding the overall temperature of the microwave irradiation space, the amount of a substance present in the space, the physical property of a substance, the shape of a substance, and damage such as a crack in the space, for example. Therefore, a wider variety of states of the first apparatus can be detected compared with the case performing state detection with use of a measurement value such as temperature or pressure. Such state detection also enables the detection of an abnormality regarding the first apparatus. Such state detection also enables performing appropriate control with respect to the first apparatus.

Although there are no particular limitations on the states of the first apparatus that can be detected by the state detection device 1 according to the present embodiment, examples such as the following can be given. For example, it can be determined whether any deposit remains after cleaning is performed in the space of the first apparatus. Also, it is possible to acquire a state indicating the extent of drying of a target object in drying processing, freeze-drying processing, or the like in the first apparatus. Also, it is possible to acquire a state indicating the extent of firing of a ceramic or the like in the first apparatus. Also, in the case where heating, drying, chemical reaction, breakdown, detoxification, sterilization, or the like is performed on content in the space in the first apparatus, it is possible to detect a difference in raw material, a difference in moisture content, the generation of sparks due to microwave heating, the adhesion of content to the wall due to stirring or the like, and the occurrence of an unanticipated abnormality such as an unanticipated temperature distribution or the generation of an unanticipated by-product, for example.

With the state detection device 1 shown in FIG. 1, it is also possible for a server to detect the state of operation of the first apparatus in a factory or the like. For example, in order to avoid the leaking of confidential information, it is thought to be desirable to avoid the case where the temperature, pressure, concentration, etc. of an object to be processed is transmitted to a server, but the possibility of the leaking of confidential information is thought to be low if the information that is transmitted to the server is related to a microwave resonance frequency, which does not directly indicate the temperature, pressure, concentration, etc. of the object to be processed. Performing state detection using information regarding a microwave resonance frequency in this way is also preferable from the viewpoint of preventing the leaking of confidential information.

Note that in the present embodiment, a case has been described in which the space in the first apparatus is irradiated with microwaves for the purpose of obtaining observation information, but there is no limitation to this. For example, in the case where the space in the first apparatus is irradiated with microwaves for the purpose of heating, reaction, or the like, observation information may be acquired using such irradiation with microwaves. In this case as well, it is assumed that the frequency of the microwaves emitted in the space in the first apparatus is swept within a predetermined range. The frequency sweeping may be performed only when obtaining observation information, or may be performed regardless of acquisition of observation information, for example.

Also, in the present embodiment, the case has been mainly described in which the state detection device 1 receives observation information transmitted from the observation information acquisition device 2, but there is no limitation to this. The acquisition unit 20 may receive observation information acquired by the observation information acquisition device 2 by a method other than reception. The reception may be reading of observation information from a recording medium storing observation information, for example.

Also, in the present embodiment, the processing steps and functions may be implemented by centralized processing performed by a single device or a single system, or may be implemented by distributed processing performed by multiple devices or multiple systems.

Also, in the present embodiment, information transmission performed between constituent elements may be such that, for example, if two constituent elements for transmitting information are physically different from each other, the transmission is performed by one of the constituent elements outputting the information and the other constituent element accepting the information, or alternatively, if two constituent elements for transmitting information are physically the same, the transmission is performed by shifting from a processing phase corresponding to one of the constituent elements to a processing phase corresponding to the other constituent element.

Furthermore, in the present embodiment, information related to the processing that is performed by the constituent elements, for example, information that is to be accepted, acquired, selected, generated, transmitted, or received by the constituent elements, information such as a threshold value, a numerical expression, or an address used by the constituent elements in the processing and the like may be retained in an unshown recording medium temporarily or for a long period of time even if not specified in the description above. Furthermore, the information may be accumulated in the unshown recording medium by the constituent elements or by an unshown accumulating unit. Furthermore, the information may be read from the unshown recording medium by the constituent elements or by an unshown reading unit.

Furthermore, in the present embodiment, if reference information or information used by each constituent element or the like, for example, information such as a threshold value, an address, or various setting values used by the constituent elements in the processing may be changed by a user, the user may be or may not be allowed to change such information as appropriate even if not specified in the description above. If the user is allowed to change such information, the change may be realized by, for example, an unshown accepting unit that accepts a change instruction from the user and an unshown changing unit that changes information according to the change instruction. The unshown accepting unit may accept the change instruction, for example, by accepting information from an input device, by receiving information transmitted via a communication line, or by accepting information read from a predetermined recording medium.

Also, in the present embodiment, in the case where two or more constituent elements included in the state detection device 1 have a communication device, an input device, or the like, the two or more constituent elements may physically share the same device, or may have separate devices.

Furthermore, in the present embodiment, the constituent elements may be configured by dedicated hardware, or alternatively, constituent elements that can be realized by software may be realized by executing a program. For example, the constituent elements may be realized by a program execution unit such as a CPU reading and executing a software program stored in a recording medium such as a hard disk or a semiconductor memory. At the time of executing the program, the program execution unit may execute the program while accessing the storage unit or the recording medium. Note that a program such as the following is an example of software that implements the state detection device 1 in the above embodiment. Specifically, this program is for causing a computer to execute the steps of acquiring observation information including information regarding a resonance frequency of microwaves introduced into a first apparatus that is a target of state detection, and detecting a state of the first apparatus by comparing the observation information with reference information including information regarding a resonance frequency of microwaves introduced into a second apparatus in a reference state.

It should be noted that, in the program, the step of acquiring information and the like does not include at least processing that is performed only by hardware, such as a processing performed by a modem, an interface card, or the like in a step of acquiring information. Also, the program may be executed by one computer or a plurality of computers. In other words, centralized processing may be performed, or distributed processing may be performed.

Second Embodiment

Figure 8:
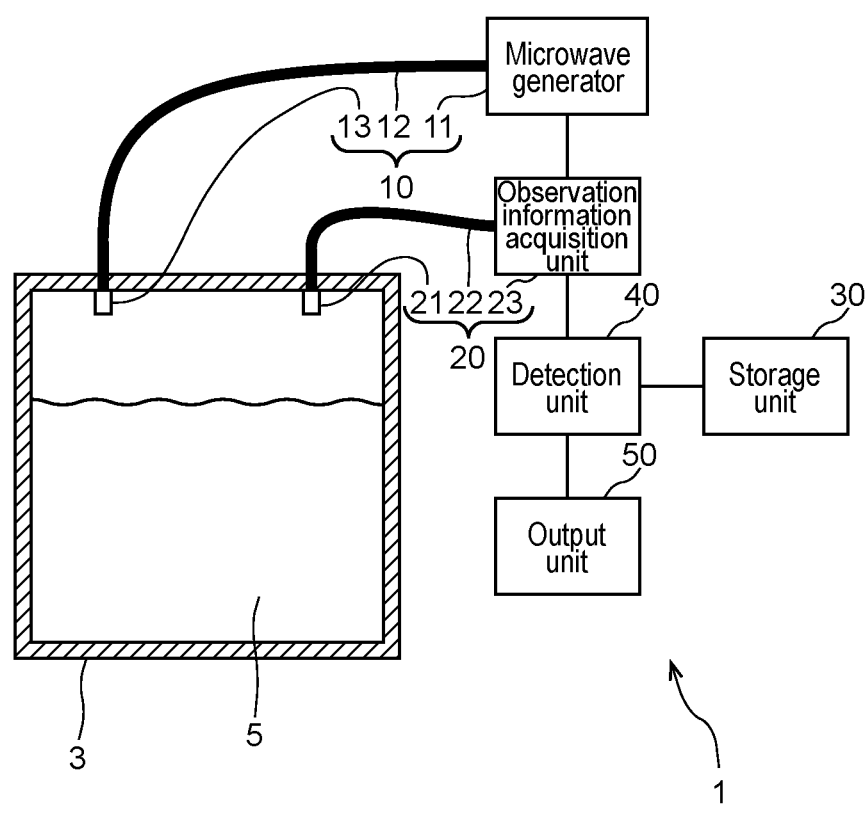
FIG. 8 is a schematic diagram showing another example of a configuration of a state detection device according to a second embodiment of the present invention.

In the present embodiment, a case is described in which the acquisition unit 20 of the state detection device 1 acquires observation information by irradiating the space in the first apparatus with microwaves while sweeping the frequency. FIG. 8 is a schematic diagram showing the configuration of the state detection device 1 according to the present embodiment. As shown in FIG. 8, the state detection device 1 may further include an irradiation unit 10 that irradiates the space in the first apparatus with microwaves. The irradiation unit 10 includes the microwave generator 11, and may include the coaxial cable 12 and the antenna 13 as required. Also, the acquisition unit 20 includes the antenna 21, the coaxial cable 22, and the observation information acquisition unit 23, and may acquire observation information by observing microwaves in a space irradiated with microwaves by the irradiation unit 10. The irradiation unit 10 may sweep the frequency while irradiating the space in the first apparatus with microwaves. The storage unit 30 of the state detection device 1 shown in FIG. 8 may store only reference information that corresponds to the first apparatus to be irradiated with microwaves. In this case, the reference information stored in the storage unit 30 is not required to be associated with an apparatus identifier. The state detection device 1 shown in FIG. 8 can detect the state of the first apparatus without transmitting observation information to a server or the like. It should be noted that processing such as the acquisition of observation information and the detection of a state by comparing observation information and reference information has already been described, and descriptions thereof will be omitted.

Moreover, it goes without saying that the present invention is not limited to the above-described embodiments, and that various modifications are possible and are also included within the scope of the present invention.

The invention claimed is:

1. A state detection device comprising:

a processor, the processor configured to:

acquire observation information including information indicating change in one or a plurality of resonance frequencies along a time series of first microwaves introduced into a first apparatus that is a target of state detection; and detect a state of the first apparatus by comparing the observation information with reference information including information indicating change in one or a plurality of resonance frequencies along a time series of second microwaves introduced into a second apparatus in a reference state, the reference information being stored before acquisition of the observation information, wherein the processor detects the state of the first apparatus in a case where the reference information and the observation information do not match with respect to a resonance frequency.

2. The state detection device according to claim 1, wherein the state detection device is a server on an IP network.

3. The state detection device according to claim 1, wherein the reference information includes a first absorption spectrum of microwaves, and the observation information includes a second absorption spectrum of microwaves.

4. The state detection device according to claim 1,
wherein the observation information includes a plurality
of pieces of time-series observation data, and
the reference information includes a plurality of pieces of
time-series reference data.

5. The state detection device according to claim 1,
wherein the state of the first apparatus that is to be
detected is at least any of an abnormality in an amount
or a shape of a substance in the first apparatus, an
abnormality in a temperature in the first apparatus, and
an abnormality in a shape of the first apparatus.

6. The state detection device according to claim 1,
wherein the processor is further configured to:
perform output related to control of the first apparatus in
accordance with a detection result of the detection unit.

7. The state detection device according to claim 1, further
comprising:
an irradiation assembly configured to irradiate a space in
the first apparatus with microwaves while sweeping a
frequency,
wherein the processor acquires the observation informa-
tion by observing microwaves in the space.

8. The state detection device according to claim 1,
wherein the second apparatus includes at least one appa-
ratus among the first apparatus and one or a plurality of
apparatuses different from the first apparatus, and
the reference information is generated based on data
obtained from the at least one apparatus.

9. A state detection method comprising the steps of:
acquiring, by a processor, observation information includ-
ing information indicating change in one or a plurality of resonance frequencies along a time series of first
microwaves introduced into a first apparatus that is a
target of state detection; and
detecting, by the processor, a state of the first apparatus by
comparing the observation information with reference
information including information indicating change in
one or a plurality of resonance frequencies along a time
series of second microwaves introduced into a second
apparatus in a reference state, the reference information
being stored before acquisition of the observation infor-
mation, and furthermore detecting the state of the first
apparatus in a case where the reference information and
the observation information do not match.

10. A non-transitory computer readable medium config-
ured to cause a computer to execute the steps of:
acquiring observation information including information
indicating change in one or a plurality of resonance
frequencies along a time series of first microwaves
introduced into a first apparatus that is a target of state
detection; and
detecting a state of the first apparatus by comparing the
observation information with reference information
including information indicating change in one or a
plurality of resonance frequencies along a time series of
second microwaves introduced into a second apparatus
in a reference state, the reference information being
stored before acquisition of the observation informa-
tion, and furthermore detecting the state of the first
apparatus in a case where the reference information and
the observation information do not match.

\* \* \* \* \*